Sept. 6, 1966  A. P. POLMON  3,270,793
THREADED INSERT
Filed Oct. 5, 1964
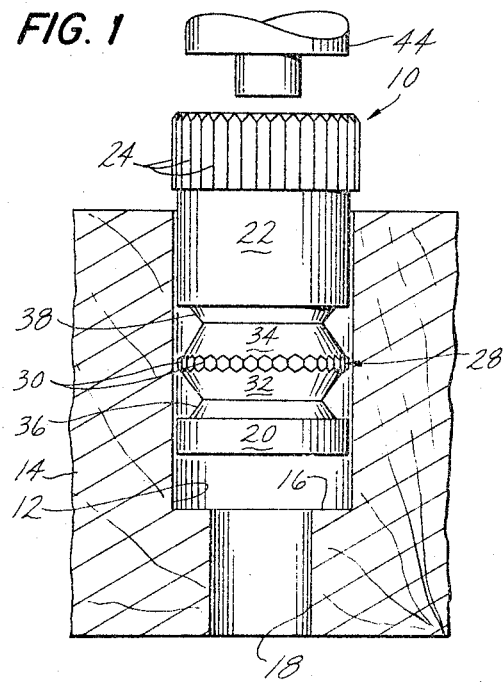
FIG. 1
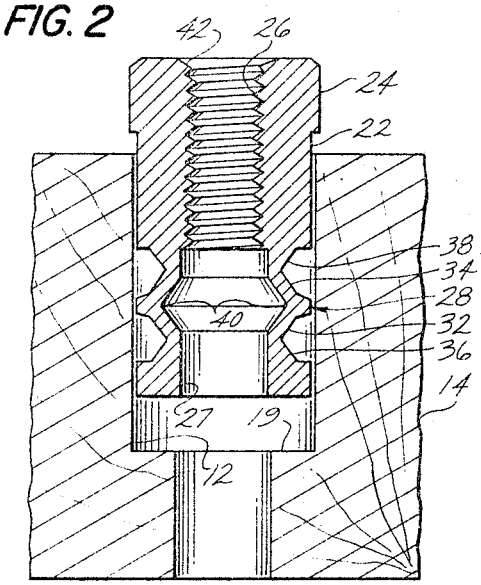
FIG. 2
FIG. 3
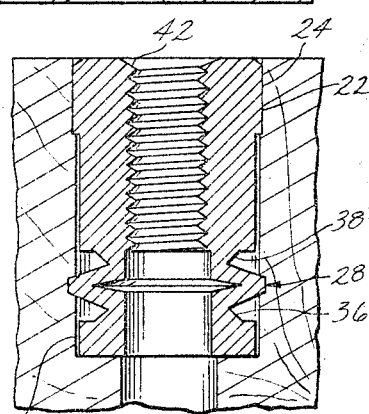
FIG. 4
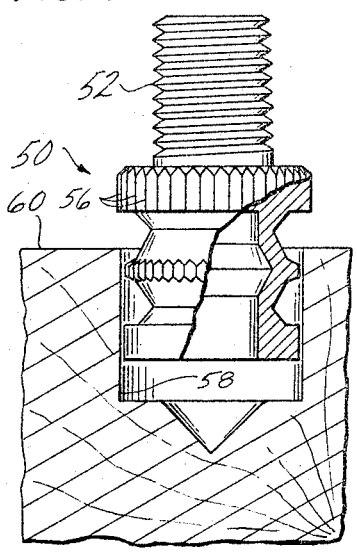
FIG. 5
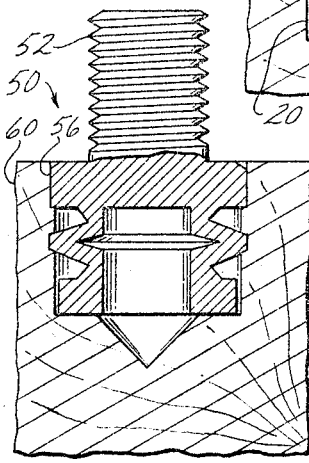
INVENTOR.
ANTHONY P. POLMON
BY *McCormick, Paulding & Huber*
ATTORNEYS United States Patent Office 3,270,793
Patented Sept. 6, 1966

3,270,793
THREADED INSERT
Anthony P. Polmon, 126 Southwest Road,
Waterbury, Conn.
Filed Oct. 5, 1964, Ser. No. 401,570
5 Claims. (Cl. 151—41.72)

This invention relates to threaded inserts for providing threaded openings or threaded studs in a member which is itself incapable of defining a permanent female or male thread due to softness or for other reasons, and deals more particularly with an insert of the radially expandable variety for permanent installation in such a member.

The general object of the present invention is to provide a threaded insert which can be quickly and easily installed in a cylindrical opening provided therefor in a member of soft or yieldable material.

A more specific object is to provide an insert which defines a threaded opening for receiving a screw or the like, which screw is not required for the installation of said insert in such an opening.

Another specific object is to provide an insert which defines a threaded stud for receiving a nut or the like, which nut is not required for the installation of said insert in such an opening.

The drawing shows preferred embodiments of the invention and such embodiments will be described, but it will be understood that various changes may be made from the constructions disclosed, and that the drawing and description are not to be construed as defining or limiting the scope of the invention, the claims forming a part of this specification being relied upon for that purpose.

Of the drawing:

FIG. 1 is a vertical side view of an insert of the present invention showing a member in section which has an opening in which said insert is being installed.

FIG. 2 is a vertical cross-sectional view of the insert shown in FIG. 1.

FIG. 3 is a vertical cross-sectional view of the FIG. 1 insert after it has been installed in such an opening.

FIG. 4 is a vertical side view partly in section of an alternative embodiment of the present invention.

FIG. 5 is a vertical cross-sectional view of the FIG. 4 insert after it has been installed in an opening.

Turning now to the drawing in greater detail, FIGS. 1–3 show an insert 10 of the present invention being installed in a cylindrical opening 12 provided therefor in a member 14 of relatively soft yieldable material not capable of defining a permanent female thread. While the member 14 is sectioned for wood, it will be apparent that it might be made of plastic, rubber or other yieldable material. The opening 12 is of a predetermined depth dictated by the collapsed length of the insert 10 and has an inner end which is defined at least in part by a generally flat radially extending shoulder portion 16. As shown, the opening 12 is in communication with a smaller opening 18 which may extend through the member 14 to receive an elongated screw (not shown). The smaller opening 18 is not required however and the inner end of the opening 12 could be defined by any suitable shape provided that the shoulder portion 16 be defined at the appropriate depth to receive the innermost end of the insert as shown in FIG. 3.

The insert 10 comprises inner and outer annular portions, 20 and 22 respectively, which are of generally cylindrical external contour corresponding to the size of the opening 12. The outer portion 22 is preferably grooved along at least a segment of its axial length as shown in FIG. 1 to define a plurality of circumaxially spaced teeth 24, 24 which extend in the general direction of the axis to permit the insert 10 to be received in its opening 12 while helping to prevent turning movement thereof relative to the member 14. A threaded opening 26 is provided in the outer portion 22 of the insert and extends generally axially therethrough to receive a screw or the like (not shown). In order to define a permanent thread and to provide teeth of adequate strength, the insert is preferably made from a metal such as brass or aluminum. These metals have been found particularly advantageous when the insert is to be used in wood as shown.

The inner portion 20 of the insert 10 is of substantially shorter axial extent than that of the outer portion 22 and preferably is not grooved as described above with reference to thte latter portion. It should be noted that the generally cylindrical external contour of the inner and outer portions of the insert 10 are preferably of such size that the insert could be loosely received in the opening 12 but for these teeth 24, 24. The teeth are preferably stamped in at least a segment of the outer portion 22 so that they project radially outwardly beyond the remaining cylindrical surface thereof giving this segment of the insert an interference fit in the opening 12. The ungrooved inner portion 20 is preferably annular in cross section and defines an opening 27 somewhat larger than the threaded opening 26 defined in the outer portion 22. As so constructed, a screw in the opening 26 can extend through the inner portion 20.

In accordance with the present invention, an intermediate annular portion 28 is provided between the inner and outer annular portions 20 and 22 respectively. Like the outer portion 22 this annular portion 28 is grooved to define a plurality of circumaxially spaced teeth 30, 30 for the same purpose as outlined hereinabove with respect to the teeth 24, 24. This annular portion 28 is at least initially of the same cylindrical external diameter as the outer portion 22 and the teeth 30, 30 therein are preferably aligned axially with the teeth 24, 24 respectively to facilitate the insertion of the insert in the opening 12. This annular portion 28 is quite short in axial extent however, for a purpose to be discussed hereinbelow.

The annular portion 28 is integrally connected to the inner and outer portions, 20 and 22 respectively, of the insert by inner and outer annular wall portions 32 and 34 respectively. In keeping with the present invention these wall portions, 32 and 34, are frusto-conical in shape having relatively thin side walls which are adapted to collapse under a predetermined compressive stress. Preferably, and as shown, these conically shaped wall portions 32 and 34 are integrally connected at their larger ends to the annular portion 28 and at their smaller ends to the inner and outer portions, 20 and 22 respectively. As so constructed, an axially directed compressive force on the insert 10 will cause a general radial straining of the annular portion 28 so directed as to urge the teeth 30, 30 radially outward into engagement with the adjacent side wall of the member 14 as shown in FIG. 3. As so installed the insert 10 is secured to the member 14 in a manner which precludes relative axial movement therebetween.

In order to facilitate the general axial collapsing of the wall portions 32 and 34 during installation, the respective ends 36 and 38 of the adjacent inner and outer portions 20 and 22 respectively, are under-cut as shown. For the same reason, the inside surface of the annular portion 28 is under-cut as shown at 40 to a diameter which is substantially greater than that of the opening 27 in the annular inner portion 20.

From FIG. 3 it will be seen that the insert 10 can be compressed axially against the shoulder portion of the opening 12. As mentioned, the opening 12 is preferably of such a depth that the outer end of the insert will be flush with the surface of the member 14 when the insert is so compressed. Preferably, and as shown, the threaded opening in the outer portion 22 is countersunk as shown at 42 to avoid damage to the threads during the installation of the insert. While a special punch or arbor, such as indicated at 44 in FIG. 1 might be used to install the insert 10 it will be apparent that an ordinary hammer could be used as well.

Turning now to the alternative insert construction shown in FIGS. 4 and 5, wherein similar portions have similar reference numerals, an insert 50 is there illustrated having a threaded stud 52 in place of the threaded opening 26 of the previous embodiment. More particularly, the stud defining outer portion of the insert 50 includes an inner axial segment which is grooved as shown to define a plurality of circumaxially spaced teeth 56, 56 in the same manner as described hereinabove with reference to the teeth 24, 24 in the outer portion 22. The teeth 56, 56 are axially aligned with the teeth 30, 30 in the annular portion 28 as mentioned previously and it will be apparent that the insert 50 can be installed in an opening 58 in the same manner as the insert 10. It should be noted that the inner end of the insert 50 can abut an inner end of this opening 58 and that the depth of this opening 58 is such that the threaded stud 52 protrudes above the surface 60 after the wall portions 34 and 36 have been collapsed as shown in FIG. 5.

Finally, the stud 52 is preferably of smaller diameter than the external cylindrical contour of the grooved portions to permit the insert to be installed with a suitable tubular punch or arbor (not shown). It will be apparent that such a special punch is not necessarily required however, and like the insert 10 described hereinabove, the insert 50 could be installed with a hammer or the like. In the latter case it might be desirable to place a nut or the like on the first few threads of the stud 52 to avoid injuring the same.

The invention claimed is:

1. A threaded insert adapted to be permanently installed in a member of yieldable material having a cylindrical opening which has an inner end against which said insert can abut, said insert comprising inner and outer generally cylindrical portions the diameter of which permit the insert to be slidably received in said opening, said outer portion defining a threaded segment and having a segment which has a plurality of radially protruding circumaxially spaced teeth each of which teeth extends generally parallel to the axis of said insert to permit the same to be pressed to its opening and to help prevent turning movement thereof relative to said member, a circumferentially continuous annular portion of said insert between said inner and outer portions and having an external diameter substantially equal to that of said outer portion, said annular portion having a plurality of radially protruding circumaxially spaced teeth each of which is axially aligned with a tooth in said outer portion, inner and outer annular wall circumferentially continuous portions of frusto-conical shape integrally connected at their larger ends to said annular portion and at their smaller ends to said inner and outer portions respectively, each of said conically shaped wall portions having a thickness which permits said wall portions to be collapsed axially under a predetermined compressive stress whereby said annular portion can be urged radially outwardly into engagement with said member.

2. An insert as set forth in claim 1 wherein said threaded segment is more particularly defined in an axially extending opening provided in said outer portion, said threaded opening being adapted to receive a screw or the like.

3. An insert as set forth in claim 1 wherein said teeth defining segment of said outer portion is more particularly located adjacent the outermost end of said insert.

4. An insert as set forth in claim 1 wherein said threaded segment is more particularly defined on an axially extending stud provided at the outer end of said insert, which stud comprises an outer segment of said insert outer portion, and an inner segment of said insert outer portion which defines said teeth as aforesaid.

5. An insert as set forth in claim 4 wherein said teeth defining inner segment of said outer portion has an external diameter substantially equal to that of said collapsible annular portion, and wherein said stud defining threaded outer segment of said outer portion has a diameter somewhat less than that of said teeth defining inner segment.

References Cited by the Examiner

UNITED STATES PATENTS

| | | | |
|---|---|---|---|
| 1,320,622 | 11/1919 | Kennedy | 85—70 |
| 2,018,251 | 10/1935 | Croessant | 85—71 |
| 2,863,185 | 12/1958 | Riedi | 151—41.73 |
| 2,923,340 | 2/1960 | Williams | 151—44 |
| 3,172,329 | 3/1965 | Setzler | 151—41.72 |

CARL W. TOMLIN, *Primary Examiner.*

M. PARSONS, JR., *Assistant Examiner.*